Figure 1:
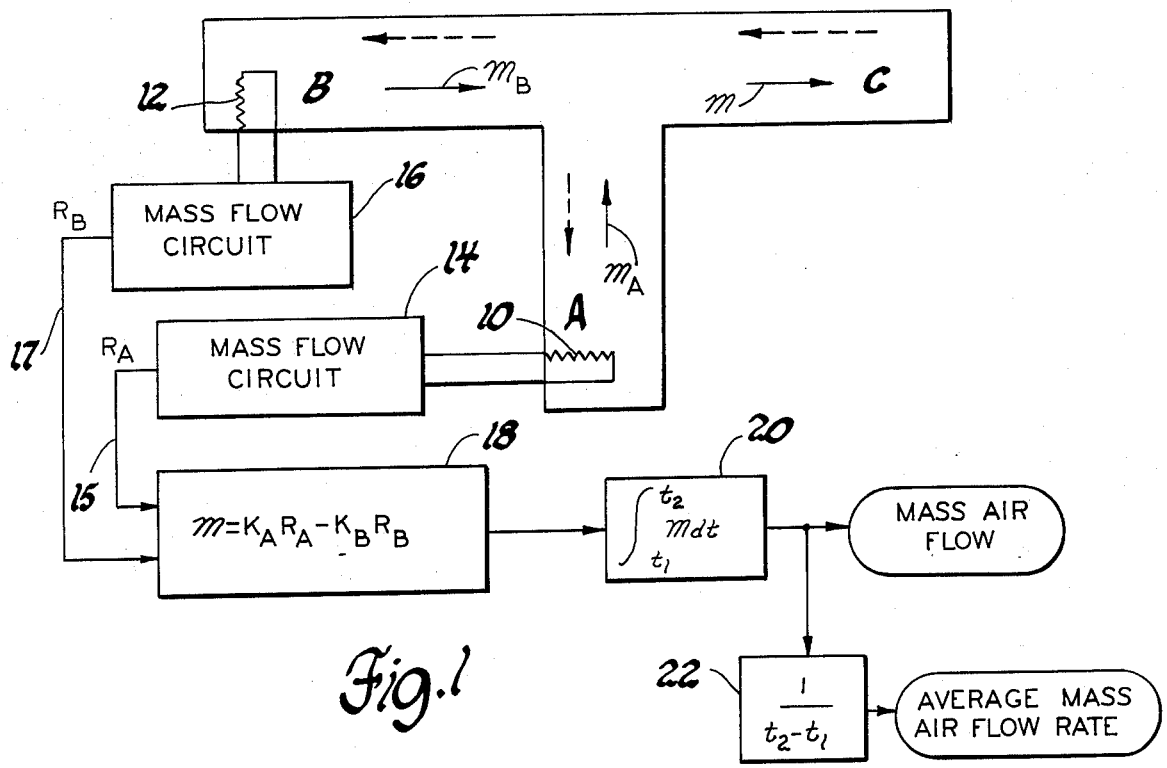

United States Patent [19]
Rask

[11] Patent Number: 4,463,601
[45] Date of Patent: Aug. 7, 1984

[54] METHOD AND APPARATUS FOR MEASURING MASS AIRFLOW

[75] Inventor: Rodney B. Rask, Grosse Pointe Woods, Mich.

[73] Assignee: General Motors Corporation, Detroit, Mich.

[21] Appl. No.: 496,953

[22] Filed: May 23, 1983

[51] Int. Cl.³ .......................... G01F 1/76; G01F 7/00
[52] U.S. Cl. ...................................... 73/118; 73/195; 73/197; 73/202
[58] Field of Search ...................... 73/118 A, 195, 196, 73/197, 202, 118 R; 364/510

[56] References Cited
U.S. PATENT DOCUMENTS 4,142,407  3/1979  Kuroiwa et al. ................. 73/118 A
4,264,961  4/1981  Nishimura et al. ........... 73/118 A X
4,404,846  9/1983  Yamauchi et al. ............... 73/118 A Primary Examiner—James J. Gill
Attorney, Agent, or Firm—Warren D. Hill

[57] ABSTRACT

Where airflow through a system is subject to forward and reverse flow, the mass airflow rate is determined by providing two flow branches A and B meeting at a junction wherein the two branches carry different proportions of airflow in the forward and reverse directions and branch B carries a greater fraction of the airflow during reverse flow than during forward flow. An airflow sensor in each branch measures the airflow irrespective of flow direction to obtain mass flow rate signals $R_A$ and $R_B$ for branches A and B, respectively. The mass airflow rate m is calculated from the equation $m = K_A R_A - K_B R_B$ where m, $K_A$ and $K_B$ are constants for a given apparatus which are determined by each sensor characteristic and the flow characteristics of the junction. The resultant mass flow rate signal m will have a positive or negative sign indicative of forward or reverse flow. Integrating the value m over a time period and dividing by the time period yields the average mass airflow rate for the period.

This method and apparatus can be used to obtain accurate induction airflow measurements for internal combustion engines.

6 Claims, 2 Drawing Figures

METHOD AND APPARATUS FOR MEASURING MASS AIRFLOW

This invention relates to mass airflow measurement and, particularly, to a method and apparatus for measuring net mass flow rate in a system where airflow occurs in forward and reverse directions.

Instruments for measuring airflow in a passage are well-known and include certain non-directional types, such as hot wax or hot film anemometers which can accurately measure the airflow passing the instruments providing the airflow is in a single direction. In flow systems where airflow reversals occur such anemometers will produce an error since they measure the flow in both directions without distinguishing the direction so that a utilization circuit would add together the opposite flows to produce an error equal to twice the amount of the reverse flow. An application where such a flow reversal occurs is in the air induction passage of an internal combustion engine. Certain engines, particularly during medium or high load conditions, do produce an oscillation in the air intake system. For fuel control purposes, it is desirable to use hot wire or hot film anemometers or other nondirectional instrumentation to measure airflow and provide electrical signals representing the average mass airflow rate to the engine over a short period comprising a fraction of one engine revolution. It is necessary then to distinguish between forward and reverse airflow so that a correct determination of the average mass airflow rate can be made.

It is therefore an object of this invention to provide a method and an apparatus for measuring mass airflow rate and direction as well as average mass airflow rate over a time period in a passage where reversals in airflow direction occur. It is a further object of the invention to measure mass airflow rate and direction as well as average mass airflow rate over a short period in an induction passage of an internal combustion engine where the airflow is subject to pulsations giving rise to flow reversals.

The method of the invention is carried out by measuring the airflow in two flow branches A and B which meet at a junction to supply air to a passage such that in the reverse direction branch B carries a greater proportion of airflow than during forward flow, the airflow in each branch being measured irrespective of the flow direction to obtain mass airflow rate signals $R_A$ and $R_B$ for the two branches, and combining the signals according to the equation $m = K_A R_a - K_B R_B$ where $K_A$ and $K_B$ are constants for a given apparatus determined by the characteristics of the airflow sensors and the characteristics of the junction of the branches.

The apparatus of the invention is carried out by providing two flow branches A and B meeting at a junction to supply air to a passage where branch B carries a greater proportion of airflow during reverse flows than during forward flow, the apparatus including airflow sensors for measuring the mass airflow in each passage to obtain instanteous mass airflow rate signals $R_A$ and $R_B$ and electrical circuitry to combine the signals according to the relationship $m = K_A R_A - K_B R_B$ where $K_B$ and $K_A$ are constants determined by the sensor characteristics and junction flow characteristics and m is the mass airflow rate through the passage.

The invention further contemplates the method and apparatus to integrate the value m to obtain the average mass airflow rate over a time period.

Figure 2:
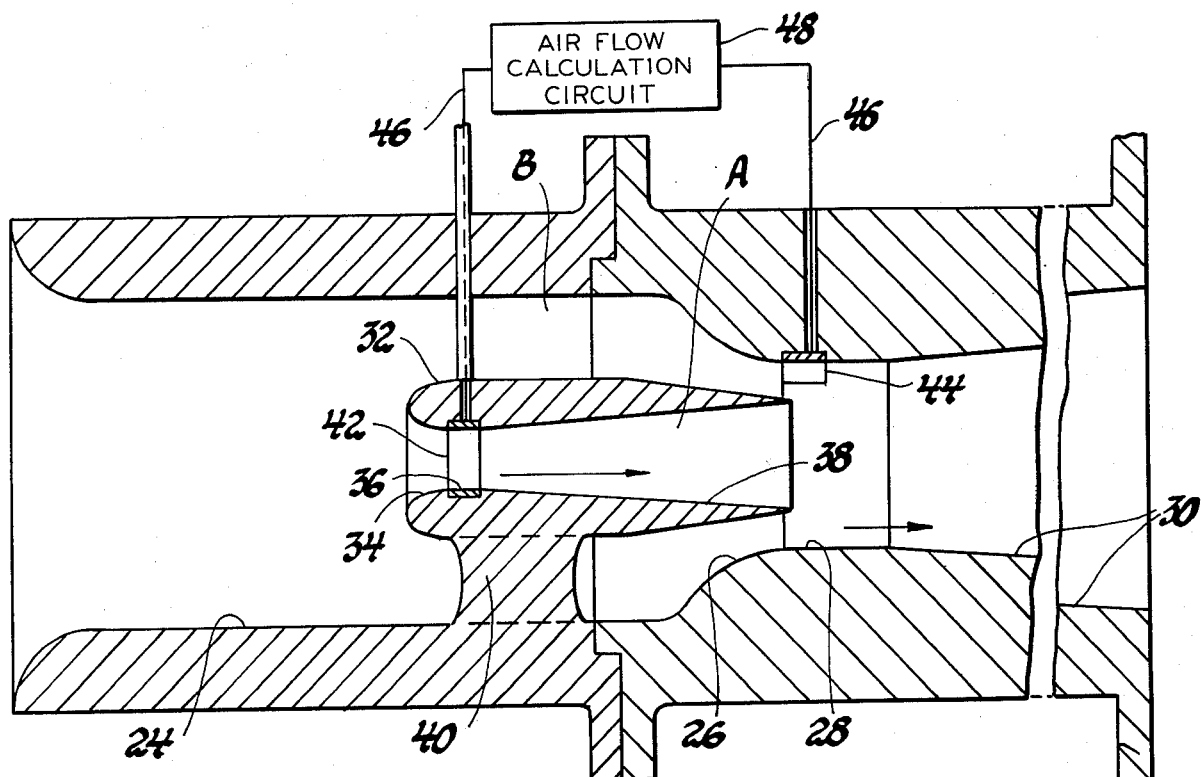

The above and other advantages will be made clear from the following description taken in conjunction with the accompanying drawings wherein:

FIG. 1 is a schematic representation of a branched airflow passage equipped with mass flow instrumentation according to the invention, and FIG. 2 is a cross-sectional view of an induction passage of an internal combustion engine equipped with airflow sensors and circuitry to carry out the method and apparatus of the invention.

In FIG. 1, an airflow passage C carrying air at an instantaneous mass airflow rate m, indicated by a solid line arrow, is fed by a branch B in line with passage C carrying air having a mass airflow rate $m_B$ and a lateral branch A carrying air at a mass airflow rate $m_A$. The normal or forward airflow directions are taken to be in the direction of the solid line arrows but reverse flow in the system is possible and is illustrated by the dotted line arrows. The fluidic junction of the branches A and B is nonsymmetrical. It is conceivable that the system design will afford equal flow in the passages A and B during the forward flow, however, in the event of reverse flow, it is expected that most or perhaps all of the flow from passage C will pass through branch B while little, if any, flow would occur in branch A. This T-shaped junction as illustrated in FIG. 1 is not intended to present a unique flow arrangement but rather it is intended to illustrate a general case of a junction characterized by the proportion of mass airflow in branch B during reverse flow being greater than the proportion during forward flow.

Hot film or hot wire sensors 10 and 12 are located in the branches A and B, respectively, to sense mass airflow. These sensors are connected to mass airflow calculation circuits 14 and 16, respectively, to produce corresponding output signals $R_A$ and $R_B$ on lines 15 and 17, respectively, representing nondirectional instantaneous mass airflow rate values. Such flow calculation circuits are well-known in the field of hot wire anemometery and, accordingly, are not described in detail. The outputs of the circuits 14 and 16 form the inputs of a circuit 18 which calculates the instantaneous mass airflow rate m through the passage C according to the algorithm $m = K_A R_A - K_B R_B$ where $K_A$ and $K_B$ are constants for a given apparatus which are determined by the sensor characteristics and the junction flow characteristics. Even though the sensors 10 and 12 cannot distinguish flow direction, the signal m will be positive for forward flow and negative for reverse flow. The output signal m is integrated over the time period from $t_1$ to $t_2$ by circuit 20. Thus, when integrated over a specific period of time mass airflow is obtained, and when that is divided by the time period in circuit 22, the average mass airflow rate is obtained. Each output is compensated for any reverse airflow.

To determine the constants $K_A$ and $K_B$, assume that the flow path sizes and the meter calibrations are such that far forward flow $$m_A = R_A \text{ and } m_B = C_B R_B. \tag{1}$$

By definition from FIG. 1, $$m = m_A + m_B. \tag{2}$$

The meters may respond differently for reverse flow such that $$|m_A| = R_A C_{AR} \text{ and } |m_B| = R_B C_B C_{BR}. \qquad (3)$$

Thus, even though the mass flow rates $m_A$ and $m_B$ are negative, the meters do not discern this and yield positive outputs $R_A$ and $R_B$. $C_{AR}$ and $C_{BR}$ are constants which account for the ratio of sensitivities to forward and reverse flows.

The nonsymmetrical junction of the branches results in different flow splits for forward and reverse flow. The flow splits $C_F$ and $C_R$ or flow proportions in the two branches are defined as $$m_A/m_B = 1/C_F \text{ for forward flow and} \qquad (4)$$

$$m_A/m_B = C_R \text{ for reverse flow.} \qquad (5)$$

Thus, factors $C_B$, $C_{AR}$ and $C_{BR}$ account for the flow meter characteristics and $C_F$ and $C_R$ account for the fluidic junction characteristics. These values are fixed for a given apparatus. By combining the algorithm $m = K_A R_A - K_B R_B$ with equations (1), (2) and (4), the following expression is obtained:

$$K_A - (K_B C_F / C_B) = 1 + C_F. \qquad (6)$$

Similarly, by combining the algorithm with equations (1), (3) and (5), the following expression is obtained:

$$1 + C_R + K_A(C_R C_{AR}) - K_B(1/C_B C_{BR}) = 0. \qquad (7)$$

The values $K_A$ and $K_B$ are obtained by the equations (6) and (7).

The average mass airflow rate $\overline{m}$ over a period $t_1$ to $t_2$ is obtained from the instantaneous mass airflow rate m by integrating m over the tim period and dividing by the time period, i.e., $$\overline{m} = \frac{\int_{t_1}^{t_2} m \, dt}{t_1 - t_2}.$$

The operation of the system can be illustrated by two simple examples. Suppose the meters are equally sensitive both forward and backward and that branches A and B are sized to give the same flow rates at the same flow meter readings $R_A$ and $R_B$. Then $C_B = C_{AR} = C_{BR} = 1$. If the junction gave equal flow splits in forward flow and was perfect in the sense that all reverse flow went through branch B, then $$C_F = 1 \text{ and } C_R = 0.$$

Then from equations (6) and (7) $K_A = 3$ and $K_B = 1$ and the appropriate algorithm is $$m = 3R_A - R_B.$$

Suppose there were forward flow of one unit in both branches A and B. Then $$m = 3(1) - 1 = 2$$

which is the proper flow rate. If there were unity reverse flow in branch B and no flow in branch A, ($C_R$ was assumed zero) then $$m = 3(0) - 1 = -1.$$

Again, the flow rate is correct and has the proper sign. It can be seen that the junction need not be perfect by reworking the above example with $C_R = 0.5$. The proper constants from equations (6) and (7) are $K_A = 7$ and $K_B = 5$, and $$m = 7R_A - 5R_B.$$

For forward flow of unity in each branch $$m = 7(1) - 5(1) = 2.$$

For reverse flow of one unit in B and 0.5 unit in A $$m = 7(0.5) - 5(1) = -1.5.$$

Again, the proper flow rates in either direction are produced by the same algorithm.

This two-sensor scheme is not restricted to hot films, but may be used with any sensor that does not distinguish direction of flow. Likewise, the fluidic junction illustrated in FIG. 1 may by any flow system where the flow has two paths to follow and divides in different proportions for forward flow and reverse flow.

FIG. 2 illustrates a mass airflow meter especially intended for use in the induction passage of an internal combustion reciprocating engine. Under some circumstances, such an engine can cause pulsations in the induction passage which actually result in some reverse flow pulses. Valve overlap and acoustic resonances in the induction system can cause such reverse flow. According to this embodiment of the invention, the induction passage has a generally cylindrical upstream portion 24 which receives air from an air filter, not shown, which feeds air to the nozzle 26 of a venturi section which narrows the passage down to a throat 28 followed on the downstream side by an outwardly tapered diffuser zone 30. A center body 32 disposed coaxially with the cylindrical passage 24 has an upstream nozzle 34 which defines the opening of a second venturi passage having a throat 36 and an outwardly tapered diffuser 38 downstream thereof. The diffuser 38 terminates in the plane of the throat 28 of the outer venturi section. The center body 32 is supported by one or more web sections 40 from the internal bore of the passage 24. As thus far described, the dual venturi arrangement is already well-known in the art as applied to flow rate metering. Such a dual venturi arrangement has the benefit when used with a hot film mass airflow sensor of increasing low flow sensitivity with a minimum penalty in high flow pressure drop. The center venturi passage corresponds to the branch A and the annular passage between the center venturi and the outer venturi corresponds to the branch B discussed above relative to FIG. 1. That is, the center body 32 in effect divides the airflow to the engine into two concentric branches which will have different flow splits in forward and reverse directions and the reverse flow in the branch B will be greater than the forward flow. Accordingly, by measuring the mass airflow rate $R_A$ and $R_B$ in branches A and B and applying the algorithm $m = K_A R_A - K_B R_B$ the mass flow rate to the engine can be determined. Thus, to measure the flow in the two branches, a hot film sensor 42 is placed in the throat 36 of the center body venturi and a second hot film sensor 44 is placed in the throat 28 of the outer venturi and exposed only to air flowing through the branch B. The sensors are connected by lines 46 to an airflow calculation circuit 48 like the circuitry shown in FIG. 1, wherein the mass flow signals $R_A$ and $R_B$ are obtained and the mass airflow rate compensated for reverse airflow pulsations is calculated. For a given airflow system, the constants $K_A$ and $K_B$ are empirically determined by making flow bench tests of the system to measure m for forward and reverse flows while taking readings for $R_A$ and $R_B$. Then by substituting the measured values into the algorithm $m = K_A R_A - K_B R_B$, the constants are identified.

It will thus be seen that according to the present invention, the airflow through a passage subject to reverse pulsations can be measured by airflow meters in branches feeding the passage and calculations made on the basis of the meter output signals can derive mass airflow measurements compensated for reverse flow pulses. It has been shown that such a method and apparatus can be used for the measurement of induction airflow to an internal combustion engine.

The embodiments of the invention in which an exclusive property or privilege is claimed are defined as follows:

1. In an airflow system subject to forward and reverse flow and having two flow branches A and B meeting at a junction to supply air to a passage C wherein the branches carry different proportions of airflow in the forward and reverse directions and the reverse flow proportion in branch B is greater than the forward flow proportion, the method of measuring mass airflow rate m through the passage comprising the steps of measuring mass airflow rate in each branch irrespective of flow direction to obtain instantaneous mass flow rate signals $R_A$ and $R_B$ for branches A and B, respectively, and combining the rate signals according to the relationship $m = K_A R_A - K_B R_B$ where $K_A$ and $K_B$ are constants determined by sensor characteristics and junction flow characteristics.

2. In an air intake system for an internal combustion engine which causes forward and reverse flow and having two flow branches A and B meeting at a junction to supply air to a passage C wherein one of the branches is a venturi located within and spaced from the walls of the other branch, the branches being configured to carry different proportions of airflow in forward and reverse directions and the reverse flow proportion in branch B is greater than the forward flow proportion, the method of measuring mass airflow rate m through the passage comprising the steps of measuring mass airflow rate in each branch irrespective of flow direction to obtain instantaneous mass flow rate signals $R_A$ and $R_B$ for branches A and B, respectively, and combining the rate signals according to the relationship $m = K_A R_A - K_B R_B$ were $K_A$ and $K_B$ are constants determined by sensor characteristics and junction flow characteristics.

3. In an airflow system subject to forward and reverse flow and having two flow branches A and B meeting at a junction to supply air to a passage C wherein the branches carry different proportions of airflow in the forward and reverse directions and the reverse flow proportion in branch B is greater than the forward flow proportion, the method of measuring average mass aiflow rate over a given period by the step of:

first measuring instantaneous mass airflow rate m through the passage comprising the steps of measuring mass airflow rate in each branch irrespective of flow direction to obtain instantaneous mass flow rate signals $R_A$ and $R_B$ for branches A and B, respectively, and combining the rate signals according to the relationship $m = K_A R_A - K_B R_B$ where $K_A$ and $K_B$ are constants determined by sensor characteristics and junction flow characteristics, and then integrating the mass airflow rate m over the given period whereby the integrated value is compensated for reverse flow and dividing by the time period to obtain the average mass airflow rate.

4. In an airflow system subject to forward and reverse flow and two flow branches A and B meeting at a junction to supply air to a passage wherein during reverse flow branch B carries a greater proportion of airflow than during forward flow, means for measuring the mass airflow rate m in the passage comprising:

a nondirectional mass airflow sensor in each branch for producing instantaneous mass airflow rate signals $R_A$ and $R_B$ for branches A and B, respectively, and electrical means for combining the signals according to the relationship $m = K_A R_A - K_B R_B$ where $K_A$ and $K_B$ are constants determined by sensor characteristics and junction flow characteristics.

5. In an airflow system subject to forward and reverse flow and two flow branches A and B meeting at a junction to supply air to a passage wherein during reverse flow branch B carries a greater proportion B airflow than during forward flow, means for measuring the average mass airflow rate in the passage over a time period comprising:

a nondirectional mass airflow sensor in each branch for producing instantaneous mass airflow rate signals $R_A$ and $R_B$ in branches A and B, respectively, electrical means for combining the signals according to the relationship $m = K_A R_A - K_B R_B$ where m is mass airflow rate in the passage and $K_A$ and $K_B$ are constants determined by sensor characteristics and junction flow characteristics, and means for integrating the value m over the time period to obtain the average mass airflow rate in the period.

6. In an air intake system for an internal combustion engine which causes forward and reverse flow in a supply passage, means for measuring the mass airflow rate m in the passage comprising:

a pair of flow branches A and B coupled to the supply passage at a junction, one of the flow branches located within the other and at least one of the flow branches comprising a venturi for enhancing airflow measurement, the branches being configured so that during reverse flow branch B carries a greater proportion of airflow than during forward flow, a nondirectional mass airflow sensor in each branch for producing instantaneous mass airflow rate signals $R_A$ and $R_B$ for branches A and B, respectively, and electrical means for combining the signals according to the relationship $m = K_A R_A - K_B R_B$ where $K_A$ and $K_B$ are constants determined by sensor characteristics and junction flow characteristics.

* * * * *

UNITED STATES PATENT AND TRADEMARK OFFICE
CERTIFICATE OF CORRECTION

PATENT NO. : 4,463,601
DATED : August 7, 1984
INVENTOR(S) : Rodney B. Rask

It is certified that error appears in the above—identified patent and that said Letters Patent is hereby corrected as shown below:

Column 1, line 11, "wax" should read -- wire --.

Column 1, line 50, "$R_a$" should read -- $R_A$ --.

Column 2, line 58, "far" should read -- for --.

Column 3, line 35, "tim" should read -- time --.

Column 4, line 22, "by" should read -- be --.

Column 5, line 52, "were" should read -- where --.

Signed and Sealed this

Thirtieth Day of April 1985

[SEAL]

Attest:

DONALD J. QUIGG

Attesting Officer     Acting Commissioner of Patents and Trademarks